United States Patent [19]

Krinsky et al.

[11] Patent Number: 5,200,692
[45] Date of Patent: Apr. 6, 1993

[54] APPARATUS FOR LIMITING CURRENT THROUGH A PLURALITY OF PARALLEL TRANSISTORS

[75] Inventors: Jeffrey A. Krinsky, Renton; Tim R. Majoch, Puyallup, both of Wash.

[73] Assignee: The Boeing Company, Seattle, Wash.

[21] Appl. No.: 764,000

[22] Filed: Sep. 23, 1991

[51] Int. Cl.⁵ .......................... G05F 1/59; G05F 1/573
[52] U.S. Cl. .................... 323/269; 323/274; 323/277
[58] Field of Search ............... 323/268, 269, 277, 312, 323/274, 284, 272, 278, 285; 307/498

[56] References Cited

U.S. PATENT DOCUMENTS

| | | | |
|---|---|---|---|
| 3,629,548 | 12/1971 | Rygiol | 219/131 R |
| 3,675,114 | 7/1972 | Nercessian . | |
| 3,731,181 | 5/1973 | Cecil et al. . | |
| 3,801,894 | 4/1974 | Spiegel | 323/269 |
| 3,943,431 | 3/1976 | Hareyama . | |
| 4,461,690 | 7/1984 | Rolff et al. | 204/228 |
| 4,536,716 | 8/1985 | Yoshida et al. | 330/69 |
| 4,729,086 | 3/1988 | Lethellier | 363/65 |
| 4,775,842 | 10/1988 | Rumreich | 330/103 |
| 5,023,541 | 6/1991 | Yosinski | 323/275 |

FOREIGN PATENT DOCUMENTS

| | | | |
|---|---|---|---|
| 3538584 | 5/1987 | Fed. Rep. of Germany . | |
| 38546 | 3/1979 | Japan | 323/269 |
| 898403 | 1/1982 | U.S.S.R. | 323/269 |

OTHER PUBLICATIONS

K. R. Stafford et al., "A Monolithic Radiation-Hardened Operational Amplifier", *Solid State Technology*, vol. 13, No. 5, pp. 67–72, May 1970.

J. A. Goretzki et al., "Regulator Current Share Circuit", *IBM Technical Disclosure Bulletin*, vol. 21, No. 4, p. 1610, Sep. 1978.

*Primary Examiner*—William H. Beha, Jr.
*Attorney, Agent, or Firm*—Christensen, O'Connor, Johnson & Kindness

[57] ABSTRACT

Disclosed is an electrical control circuit (10) for controlling current through a furnace coil or other resistive load (14). The control circuit includes a plurality of current control stages (12(1), 12(2), ... 12(N)), a minimum circuit (16), and a control system (22) which provides feedback from the load. The control circuit utilizes a signal conditioner (20) and a sensor (18) to provide information regarding the load to the minimum circuit. The minimum circuit provides the minimum of inputs from the control system and a limit circuit (24) to the current control stages, thereby controlling the current that is drawn through the load. Each current control stage includes an operational amplifier (30), a pass transistor (34), a sense resistor ($R_s$), and a feedback resistor ($R_f$). The sense resistors ensure that there is current sharing through each of the current control stages. The operational amplifiers are a pre-drive to the pass transistors to allow smaller sense resistors to be used. The feedback resistors ($R_f$) provide degenerative feedback to the operational amplifiers.

13 Claims, 4 Drawing Sheets

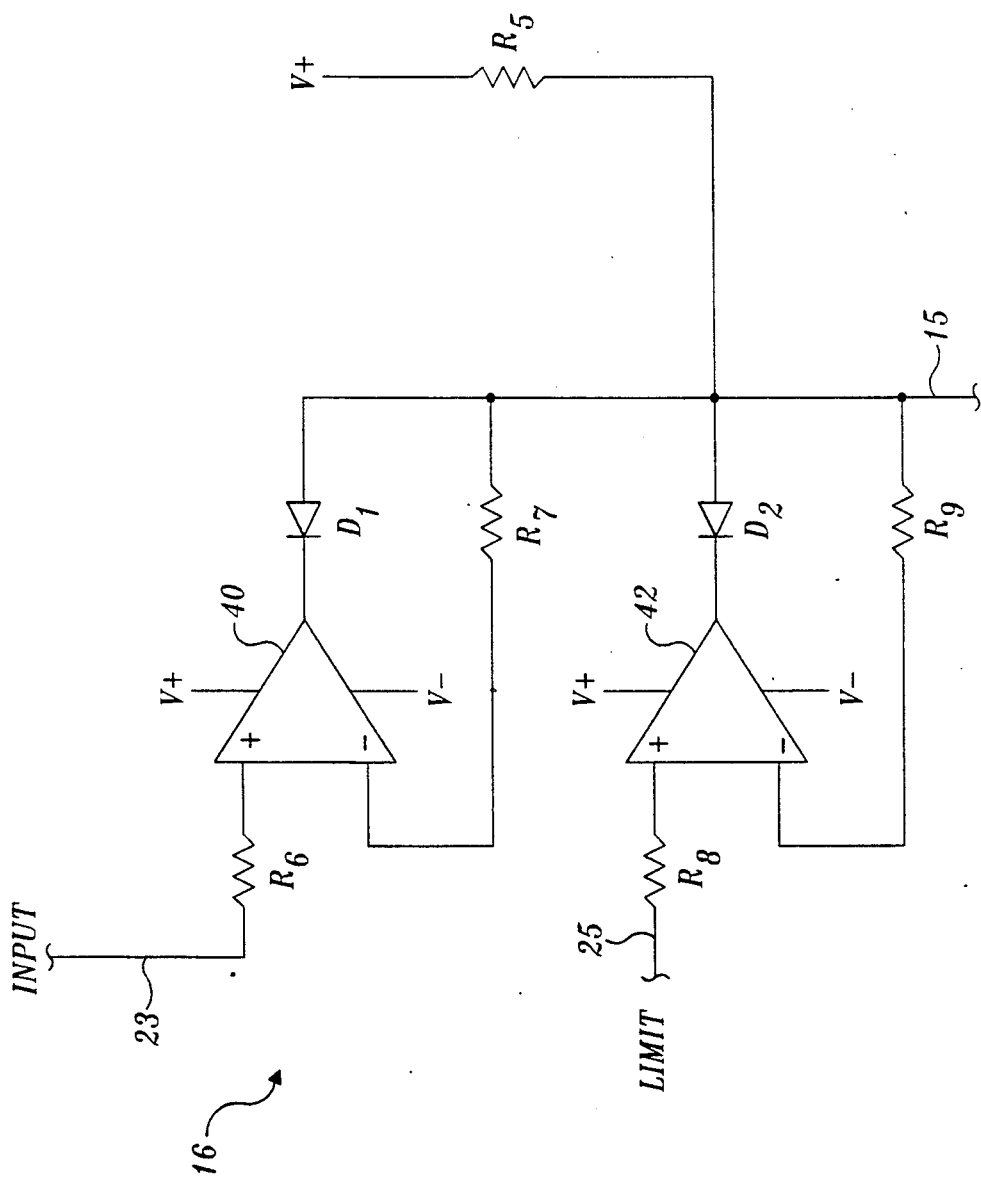

APPARATUS FOR LIMITING CURRENT THROUGH A PLURALITY OF PARALLEL TRANSISTORS

FIELD OF THE INVENTION

The present invention relates to the regulation of power in general, and more particularly, to a method and apparatus for providing current protection and control to a plurality of branches in a circuit.

BACKGROUND OF THE INVENTION

Many electrical applications require current or power dissipation beyond the ratings of a single transistor. In these applications, two or more transistors, called pass transistors, are often connected in parallel to meet the current or power requirements of the circuit. Common applications in which pass transistors are used include power switching and power regulation.

To operate effectively, the pass transistors must share current equally to prevent problems of thermal runaway. Thermal runaway is a condition where one of a group of parallel-connected pass transistors begins to heat up, thereby lowering the base-emitter voltage drop ($V_{BE}$) and increasing the gain ($h_{fe}$) of the transistor. In turn, the fluctuation of $V_{BE}$ and $h_{fe}$ further increases the current flow through the transistor, creating additional heat that has a further effect on these parameters. Eventually, the current flow through the transistor may exceed the ratings of the transistor, causing failure. Merely connecting the pass transistors in a parallel configuration will not provide equal current sharing, because of the inherent characteristics of the transistors. In particular, the bipolar transistors used as pass transistors typically have a wide variation in the base-emitter voltage drops and different gain values.

A common method to ensure equal current sharing is to use current sense resistors, i.e., emitter resistors, to provide degenerative feedback, thereby masking the individual differences of the transistors. The voltage drop across the emitter resistors can also be monitored to prevent an over-current condition through the pass transistors. To work effectively, the resistors chosen should have a voltage drop at maximum current which is at least as large as the base-to-emitter voltage of the pass transistors, typically several tenths of a volt. The power lost in the current-sense resistors is typically not available for a useful purpose, and the power available to the load is therefore reduced. In addition, this extra power dissipation usually increases the complexity, cost, and size of the electrical system. More recently, operational amplifiers have been utilized to drive the pass transistors, allowing lower resistances to be used for the sense resistors.

The disadvantages associated with typical methods of providing current sharing become increasingly important when high efficiency is required at near-full load of the system, e.g., when the power being dissipated by the load approaches the limits of the total power available to the system. Continuing efforts are being made to provide current control and over-current protection without dissipating significant amounts of power for this purpose.

SUMMARY OF THE INVENTION

The disclosed invention is an electrical control circuit for use in applications that require equal or non-equal current sharing. In a preferred embodiment, the control circuit is for controlling current through a resistive load, for example, a furnace coil. The control circuit comprises a plurality of current control stages, a minimum circuit, a sensing circuit, and a feedback circuit. Each current control stage includes first, second, and third terminals, and means for conducting current between the first and second terminals in response to a control signal present at the third terminal. The sensing circuit determines a value that is a function of the current conducted through the load. The feedback circuit responds to the sensing circuit to generate a first input signal that is indicative of the desired level of current through the load. The limit circuit generates a second input signal that establishes the maximum level of current to be conducted through the load. The minimum circuit responds to the first input signal from the feedback circuit and to the second input signal from the limit circuit to provide the control signal present at the third terminal of each current control stage.

BRIEF DESCRIPTION OF THE DRAWINGS

The various features and advantages of the invention will be understood in view of the following description taken in conjunction with the accompanying drawings in which:

FIG. 4 is a circuit diagram of a preferred embodiment of the minimum circuit shown in block form in FIG. 1;

DETAILED DESCRIPTION OF THE PREFERRED EMBODIMENT

Figure 1:
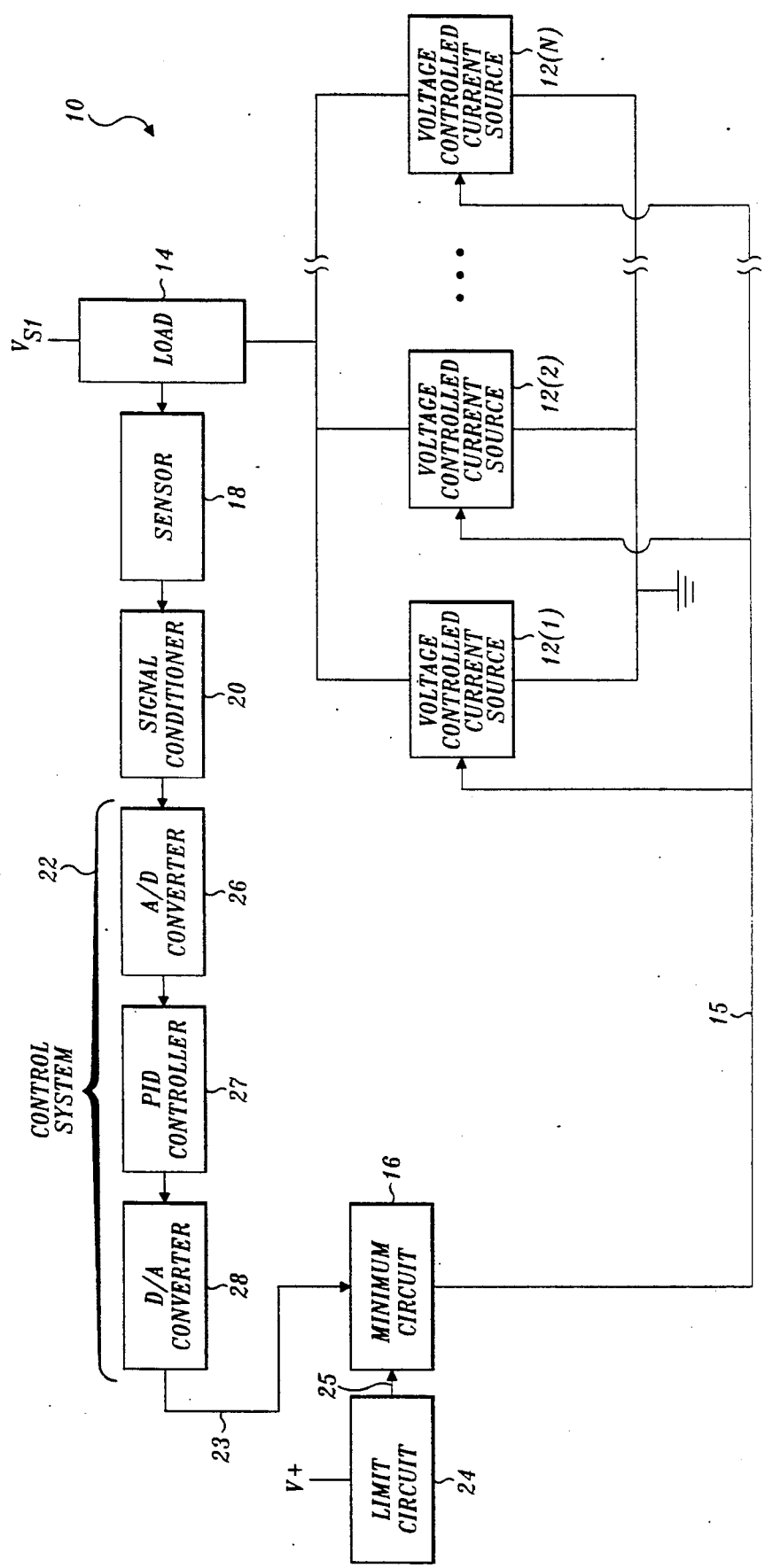
FIG. 1 is a block diagram of a control circuit in accordance with the invention.

The present invention is an electrical control circuit for controlling current through a load. With reference to FIG. 1, control circuit 10 includes a plurality of voltage controlled current sources 12(1), 12(2), . . . 12(N) which are coupled in parallel between a load 14 and ground (or any other reference potential). The load 14 is connected to a voltage source $V_{S1}$. The current sources 12 draw current from $V_{S1}$ through the load 14 in response to a control signal on line 15 from a minimum circuit 16.

The current through the load is monitored by a sensor 18. The relatively low level signals from the sensor 18 are then amplified by the signal conditioner 20 and fed into a control system 22. Control system 22 provides feedback from the load 14 by comparing values indicative of the actual and desired rates of current through the load. An appropriate voltage based on this comparison is sent to the minimum circuit 16. Minimum circuit 16 provides the minimum of two voltage signal inputs to the voltage controlled current sources 12; one input is a comparison of actual and desired current through the load from control system 22 (on line 23), and the second is from a limit circuit 24 (on line 25). The limit circuit 24 establishes the maximum level of current that can be drawn through the voltage controlled current sources 12.

In one preferred embodiment, control circuit 10 is a temperature controller with the load 14 being a furnace coil inside a furnace and the sensor 18 being a thermocouple mechanically connected to the furnace coil. For such an embodiment, the signal conditioner 20 may comprise a thermocouple amplifier such as the AD594/AD595 manufactured by Analog Devices. Control system 22 preferably includes an analog-to-digital converter (A/D converter) 26, a proportional integral differential (PID) controller 27, and a digital-to-analog converter (D/A converter) 28. The PID controller may be implemented using a general purpose data processor and a suitable computer program. Desired temperature values within the furnace are controlled through the PID controller 27.

As an alternative, the control system 22 can be implemented using a buffer amplifier connected to the signal conditioner 20 and a temperature error amplifier (operational amplifier). The temperature error amplifier receives a first input from the buffer and a second input from a potentiometer, the potentiometer providing for manual temperature control of the furnace. Moreover, as will be appreciated by those skilled in the art, substitution of appropriate circuitry as the sensor 18 and signal conditioner 20 will allow the control circuit 10 to monitor values other than temperature. For example, light intensity, sound intensity, pressure, velocity, flow rate, and other quantities can be measured as desired for a particular application of the control circuit 10.

Figures 2, 3:
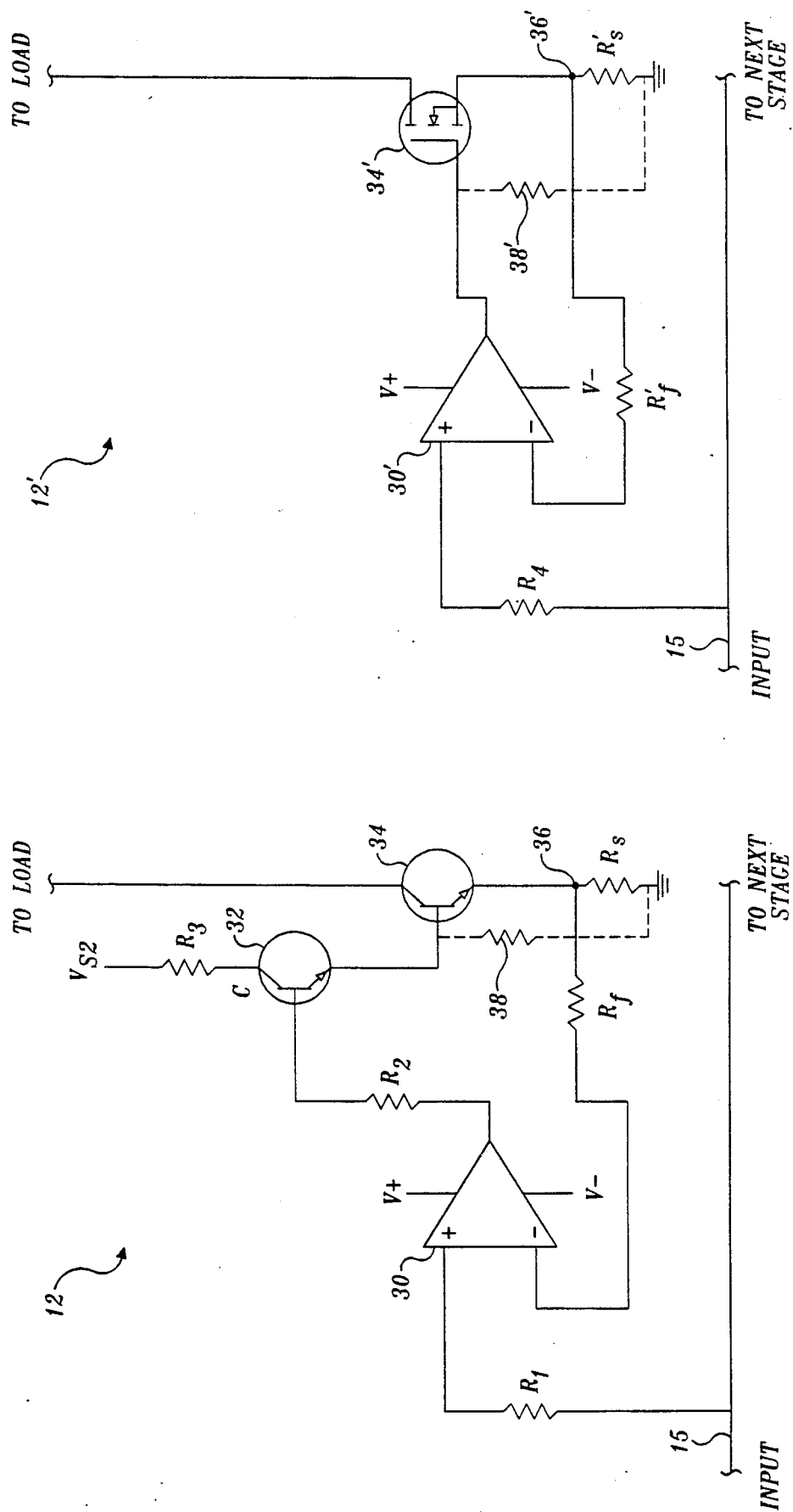
FIG. 2 is a circuit diagram of a first preferred embodiment of a voltage control current source representative of the voltage controlled current sources shown in block form in FIG. 1.
FIG. 3 is a circuit diagram of a second preferred embodiment of a voltage controlled current source representative of the voltage controlled current sources shown in block form in FIG. 1.

FIG. 2 illustrates a first preferred embodiment of a current source (12) representative of one of the voltage controlled current sources 12(1), 12(2), . . . 12(N) depicted in block form in FIG. 1. Current source 12 includes an operational amplifier 30, a drive transistor 32, a pass transistor 34 and a sense resistor $R_s$. The noninverting input of the operational amplifier 30 is coupled to the output of the minimum circuit via line 15, preferably through a resistor $R_1$. The inverting input of the operational amplifier 30 is connected to a feedback resistor $R_f$ which in turn is connected to a node 36 located between the emitter of the pass transistor 34 and the sense resistor $R_s$. The output of operational amplifier 30 is connected to the base or control terminal of drive transistor 32 through a resistor $R_2$. The resistor $R_2$ limits the total current drive to the drive transistor 32 when the operational amplifier 30 is fully on.

The collector or input terminal of the drive transistor 32 is coupled to a voltage source $V_{S2}$, preferably through a resistor $R_3$. Resistor $R_3$ limits the current drawn by the drive transistor 32 to minimize power dissipation and to prevent thermal runaway of transistor 32. A suitable operating voltage for voltage source $V_{S2}$ is on the order of 5 volts (with reference to ground), which is commonly available in many systems. A voltage source separate from voltage source $V_{S1}$ is used because the drive transistor 32 does not require the power capacities of $V_{S1}$. Thus, the use of a lower voltage supply minimizes the total power dissipated by the control system 10. However, drive transistor 32 can be connected to voltage source $V_{S1}$ or another voltage source. Further, it may be beneficial in some applications to connect the transistors 32 and 34 as a Darlington pair, although this connection is less efficient than the disclosed embodiment of FIG. 2.

The emitter or output terminal of drive transistor 32 is connected to the base (control terminal) of pass transistor 34. The drive transistor 32 provides a current gain $h_{fe}$ to drive the pass transistor 34. It is noted that additional drive transistors may be required to drive the pass transistor 34. The need for additional drive transistors is dependent, in part, upon the drive requirements of the pass transistor 34. The collector (input terminal) of pass transistor 34 is connected to the load. Further, the emitter of the pass transistor 34 is connected to the sense resistor $R_s$ at node 36. The resistor $R_s$ is connected between node 36 and ground.

In the operation of current source 12, a signal proportional to the desired current through the load 14 is generated by the minimum circuit, and applied to the noninverting terminal of the operational amplifier 30 via line 15. The signal is amplified by the operational amplifier 30, turning on the drive transistor 32. Collector-emitter current begins to flow through transistor 32, turning on the pass transistor 34. The collector-emitter current from the pass transistor 34 flows through the feedback resistor $R_f$ and sense resistor $R_s$ providing a voltage signal to the inverting input of the operational amplifier. Upon equalization of the noninverting and inverting inputs of the operational amplifier 30, current through the sense resistor $R_s$ is maintained at a constant value until a new input is generated by the minimum circuit on line 15.

In general, a value indicative of the current flowing through the load 14 can be sensed at the load or, alternatively, by sensing the sum of the current through the sense resistors $R_s$ in each current source 12(1), 12(2), . . . 12(N). Sensing the sum of the current through the sense resistors is useful in fault-monitoring applications. It is noted that the sum of the current through the sense resistors $R_s$ of each current source 12 will be slightly greater than the current through the load. This is due to base-to-emitter drive current ($I_{be}$) of the pass transistors 34 flowing through the sense resistors $R_s$ but not the load 14. In the embodiment of FIG. 1, a value that is a function of the current through the load 14 itself is sensed by monitoring the temperature of the furnace through sensor 18.

The current flow through the load 14 for any given signal generated by the minimum circuit will depend, for the most part, upon the value of the sense resistors $R_s$. This is because the operational amplifier 30, ideally, will have little or no voltage drop across feedback resistor $R_f$. In the preferred embodiment, all of the sense resistors $R_s$ are of the same resistance, providing equal current flow through each current source 12. It will be appreciated that the control circuit may be adapted to accommodate non-equal current sharing by using two or more different values of resistance for the sense resistors $R_s$.

The use of an operational amplifier as a pre-drive to the drive and pass transistors 32 and 34 allows relatively small resistances to be used for the sense resistors $R_s$, thereby reducing the power consumption in these resistors and the circuit as a whole. For example, in the preferred embodiment the sense resistors are on the order of 1 milliohm.

Current is shared among the branches of the circuit because the operational amplifier 30 of each voltage controlled current source 12 limits the current through its associated pass transistor 34 to 1/N of the desired current through the load. Thus, the inherent characteristics of the individual pass transistors 34 do not affect the current flow through the branches (voltage controlled current sources 12) of the control circuit. The minimum resistance of the sense resistors $R_s$, however, is limited by the characteristics of the operational amplifier used for the operational amplifier 30. As the value of the sense resistors $R_s$ is decreased, the voltage drop across these resistors will approach the offset voltage of the operational amplifier; and, as these values approach one another, the likelihood of error in the circuit is increased.

As is known to those skilled in the art, the leakage current $I_{CB}$ (through the collector and base) of a transistor increases with increasing temperature. At higher temperatures, $I_{CB}$ current may inadvertently turn the pass transistor 34 on or may prevent the transistor from turning off if previously on. An optional shunt resistor 38 placed between the base of pass transistor 34 and ground (i.e., to the end of sense resistor $R_s$ opposite node 36) will provide a shunt path for $I_{CB}$ current and thus, ensure that the pass transistor does not turn on or inadvertently remain on as a consequence of the collector-base leakage current.

FIG. 3 illustrates a second preferred embodiment of a current source (12') representative of one of the voltage controlled current sources 12(1), 12(2), . . . 12(N) depicted in block form in FIG. 1. Current source 12' includes an operational amplifier 30', a field-effect pass transistor 34', a sense resistor $R'_s$ and a feedback resistor $R'_f$. The pass transistor 34' replaces the drive and pass transistors 32 and 34 of the current source 12 depicted in FIG. 2. Pass transistor 34' includes a control terminal (gate), an input terminal (drain), and an output terminal (source).

The circuit connections of the circuit depicted in FIG. 3 are similar to those of FIG. 2. The noninverting input of the operational amplifier 30' is coupled to the output of the minimum circuit via line 15, preferably through a resistor $R_4$. The inverting input of the operational amplifier 30' is connected to the feedback resistor $R'_f$. The output of the operational amplifier 30' is connected to the gate of the pass transistor 34'. The source of the pass transistor 34' is connected to the feedback resistor $R'_f$. The sense resistor $R'_s$ is connected between the source of the pass transistor 34' and ground. The drain of the pass transistor 34' is connected to the load. An optional shunt resistor 38' may be used to ensure shut-off of the pass transistor 34'. The shunt resistor 38' is connected between the gate of the pass transistor 34' and ground.

Current source 12' functions in a manner similar to the current source 12 of FIG. 2. The use of field-effect transistors is advantageous in some applications because they are highly efficient and can typically be driven from the output of an operational amplifier, without requiring a drive transistor. It is noted, however, that a second field-effect transistor can be used as a drive transistor (with connections similar to the drive transistor 32) to reduce the time delay in which the current sources 12' react to inputs from the minimum circuit. A further advantage to using field effect transistors over the bipolar embodiment is that the current through the sense resistors $R'_s$ will more closely approximate the current through the load. Also, field effect transistors do not require current when in a steady state, i.e., when current through the pass transistor 34' remains constant.

In contrast to using field-effect transistors, the use of bipolar transistors as the drive and pass transistors 32 and 34 (of FIG. 2) is advantageous in some radiation environments (e.g., space or other heavy ion environments). Under some operating conditions, field-effect transistors are prone to burnout due to single event upset (SEU). The use of bipolar transistors avoids problems associated with single event upset because the capacitance associated with the junctions of (power) bipolar transistors are not prone to stray ionization currents.

With reference to FIG. 4, the minimum circuit 16 provides over-current protection to the electrical system 10 by limiting the voltage that can be applied to each of the current sources 12. To this end, the output on line 15 of the minimum circuit 16 is the minimum of two inputs. The first input is established on line 23 by the control system through a comparison of a set point indicating desired current flow for the load 14 (e.g., desired temperature) and the actual current through the load (e.g., actual temperature). The second input is a predetermined reference voltage generated by the limit circuit on line 25 that establishes the maximum voltage level applied to the voltage controlled current sources 12(1), 12(2), . . . 12(N). This maximum voltage can be based, for example, on the ratings of the pass transistors or a maximum current draw available through the voltage source $V_{S1}$.

The minimum circuit 16 includes an operational amplifier 40 that receives its input from the control system, an operational amplifier 42 that receives its input from the current limit circuit, and a pair of diodes D1 and D2. The cathodes of the diodes D1 and D2 are connected to the output terminals of the operational amplifiers 40 and 42, respectively. The anodes of the diodes D1 and D2 are commonly connected to line 15, which is also connected to a power supply $V_+$ through a resistor $R_5$. A suitable voltage level for $V_+$ is on the order of 5 volts.

Operational amplifier 40 receives an input to its noninverting terminal via line 23, preferably through a resistor $R_6$. As is stated above, the signal on line 23 is generated by the control system in response to a comparison of the actual and desired current flow through the load. The inverting terminal of operational amplifier 40 is connected to line 15 through a feedback resistor $R_7$. The operational amplifier 40 draws current from the voltage supply $V_+$ to equalize the voltage potential appearing at its noninverting and inverting inputs. Thus, without taking into account the effect of operational amplifier 42, a voltage signal applied to the noninverting input will be present at the inverting input terminal and on line 15.

Operational amplifier 42 operates in the same manner as operational amplifier 40. The operational amplifier 42 receives an input to its noninverting terminal via line 25, preferably through a resistor $R_8$. The signal on line 25 is generated by the limit circuit to establish the maximum voltage potential that can be applied to the current sources via line 15. Operational amplifier 42 includes a feedback resistor $R_9$ connected between line 15 and its inverting input terminal. The operational amplifier 42 will also work to equalize the voltage appearing at its noninverting and inverting inputs, and thus, will attempt to place the voltage appearing at its noninverting input on line 15.

The operational amplifiers 40 and 42 operate in conjunction such that the voltage level appearing on line 15 will be the minimum of the potentials appearing on lines 23 and 25. The operational amplifier having the lowest input signal will draw sufficient current from $V_+$ (across $R_S$) to bring the value of line 15 to that potential. The operational amplifier having the higher input potential will attempt to equalize its noninverting and inverting inputs by reducing current through resistor $R_S$, but will fail to do so, since the diode connected to the operational amplifier with the higher input signal will become reversed biased and turn off, thereby blocking the output of that operational amplifier. The (higher input) operational amplifier will continue to attempt to equalize its inputs until the voltage appearing at its output is approximately equal to the output of voltage source $V_+$ (e.g., approximately 5 volts). Thereafter, the diode connected to the (higher input) operational amplifier will remain off until the input to this amplifier becomes approximately equal to or falls below the input to the (lower input) operational amplifier.

The operational amplifier 42 will have its input set to a maximum predetermined voltage level corresponding to the maximum current draw through the load. The operational amplifier 40 will fluctuate in response to the output of the control system (e.g., PID controller). Thus, it will be appreciated from the foregoing discussion that the voltage appearing on line 15 will track the output of the control system (via the operational amplifier 40) to a predetermined maximum (i.e., the input to the operational amplifier 42). Once this predetermined maximum value is reached, line 15 will be held to this potential despite any efforts by the control system to drive it higher. Hence, current flow through the load will remain constant. Thereafter, when the output of the control system falls below the limit set by the limit circuit, line 15 will again track the input from the control system.

Figure 5:
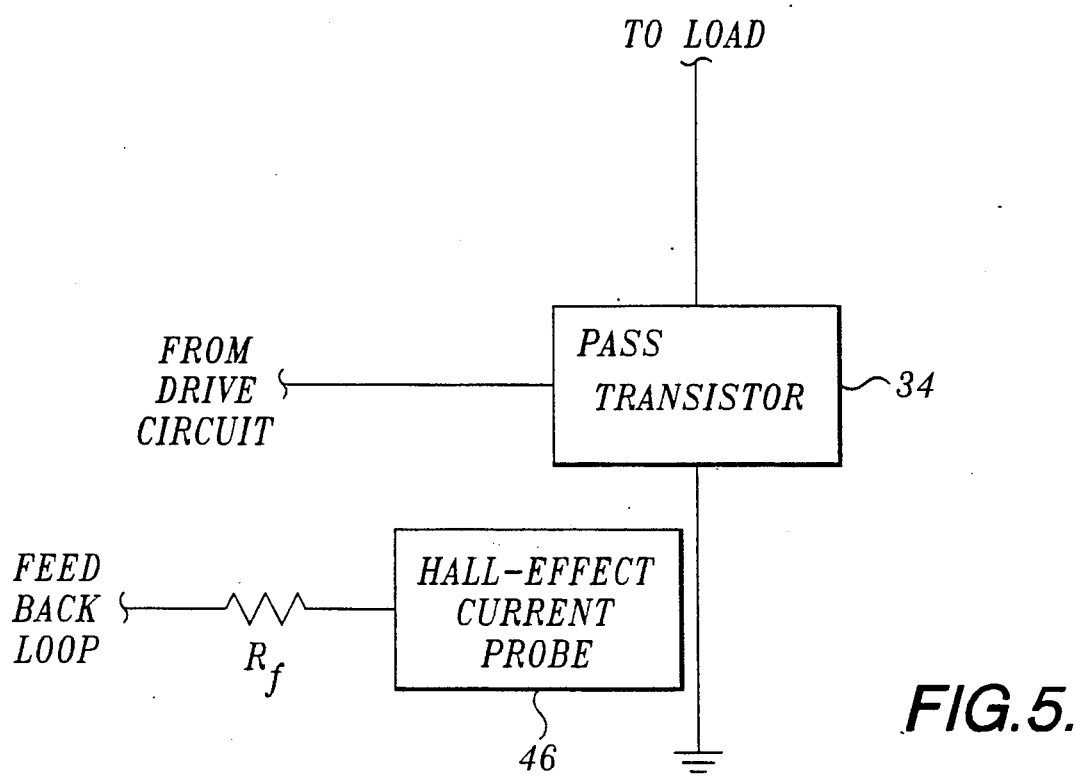
FIG. 5 is a circuit diagram illustrating the use of a non-resistive current probe as an alternative to the sense resistors implemented in the voltage controlled current sources of FIGS. 2 and 3.

FIG. 5 illustrates an alternative embodiment of the current source 12 of FIG. 2, where the sense resistor $R_s$ is removed and the output terminal (emitter) of the pass transistor 34 is connected to ground. Current through the pass transistor 34 is monitored by a Hall-effect current probe 46. The current probe 46 is placed in close proximity to the pass transistor-ground connection, thereby allowing the sensing of current therethrough. The output terminal of the current probe 46 is connected to the feedback resistor $R_f$. The current probe 46 provides a non-resistive means of sensing current through the pass transistors in the control circuit to provide current sharing. Other non-resistive methods of current sensing may also be implemented.

Figure 6:
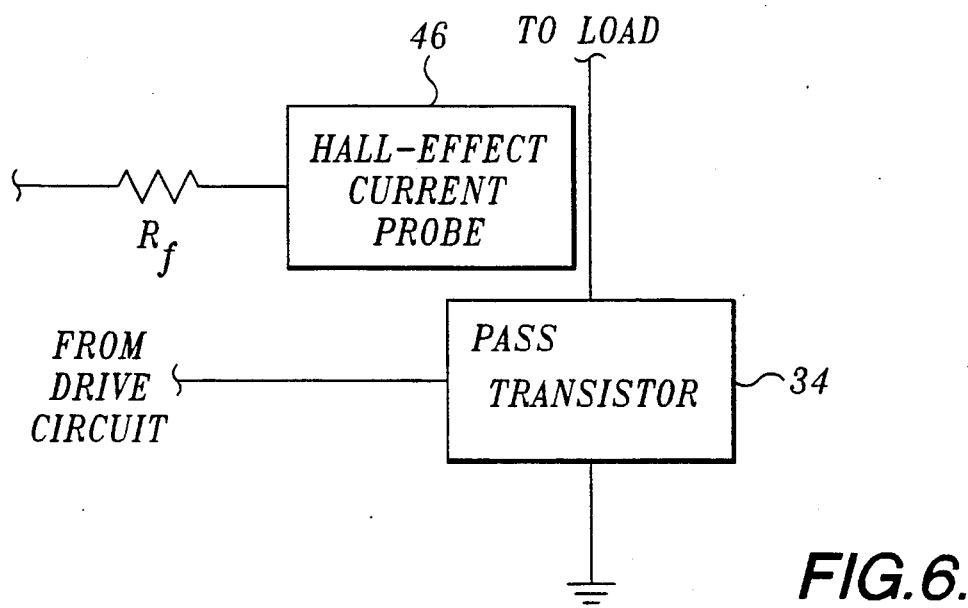
FIG. 6 is a circuit diagram illustrating an alternative embodiment of the circuit diagram of FIG. 5.

With reference to FIG. 6, in a second alternative embodiment, the current probe 46 of FIG. 5 is placed between the input terminal (collector) of the pass transistor 34 and the load. The operation of current probe 46 of FIG. 6 is similar to that of FIG. 5. It is noted that the embodiments of FIGS. 5 and 6 may also be implemented in the current source 12' of FIG. 3, utilizing similar circuit configurations as those depicted in FIGS. 5 and 6.

Although the present invention has been described with respect to its preferred embodiments, those skilled in the art will realize that changes may be made in form and scope without departing from the spirit of the invention. Therefore, the scope of the invention should be determined solely by reference to the following claims.

The embodiments of the invention in which an exclusive property or privilege is claimed are defined as follows:

1. Apparatus for controlling current through a load, comprising:
   a plurality of current control stages, each current control stage including first, second and third terminals, and means for conducting current between the first and second terminals in response to a control signal present at the third terminal;
   minimum circuit means, responsive to first and second input signals, for generating the minimum of the first and second input signals to thereby establish the control signal;
   sensing means for determining a value that is a function of the current flow through the load;
   feedback means, responsive to said sensing means, for generating the first input signal such that the first input signal is indicative of a desired level of current through the load; and
   limit circuit means for generating the second input signal, to thereby establish a maximum current flow through the current control stages.

2. The apparatus of claim 1, wherein the load is coupled between a power supply and the first terminal of each current control stage.

3. The apparatus of claim 1, wherein each current control stage includes an operational amplifier, a pass transistor, a current sense resistor and a feedback resistor, the operational amplifier having an inverting input terminal, a noninverting input terminal coupled to receive the control signal, and an output terminal, the pass transistor having a control terminal, an input terminal corresponding to the first terminal of the current control stage and an output terminal, the current sense resistor being connected between the output terminal of the pass transistor and a reference potential, the feedback resistor being connected between the inverting input of the operational amplifier and the output terminal of the pass transistor, each current control stage further including means for coupling the output of the operational amplifier to the control terminal of the pass transistor.

4. The apparatus of claim 3, wherein the means for coupling comprises a drive transistor, the drive transistor having a control terminal, an input terminal and an output terminal, the control terminal of the drive transistor being connected to the output terminal of the operational amplifier and the output terminal of the drive transistor being coupled to the control terminal of the pass transistor to drive the pass transistor in response to a signal present at the noninverting input of the operational amplifier.

5. The apparatus of claim 3, wherein the minimum circuit means includes (a) first and second operational amplifiers responsive to the first and second input signals, respectively, each operational amplifier having an inverting input terminal, a noninverting input terminal, and an output terminal, (b) means, responsive to the greater of the first and second inputs, for blocking the output of the first and second operational amplifiers, and (c) first and second feedback resistors, coupled between the means for blocking and the inverting inputs of the first and second operational amplifiers, respectively.

6. The apparatus of claim 5, wherein the means for blocking includes first and second diodes, each having an anode and a cathode, the cathodes of the first and second diodes connected to the output terminals of the first and second operational amplifiers, respectively, and the anodes of each diode coupled to each other and to the first and second feedback resistors.

7. The apparatus of claim 3, wherein the pass transistor is a field-effect transistor.

8. The apparatus of claim 4, wherein the drive and pass transistors are bipolar transistors.

9. The apparatus of claim 2, wherein each current control stage includes a current probe positioned so as to sense the level of current being conducted through the current control stage.

10. The apparatus of claim 9, wherein each current probe includes an output terminal and each current control stage further includes an operational amplifier, a pass transistor, and a feedback resistor, the operational amplifier having an inverting input terminal, a noninverting input terminal coupled to receive the control signal, and an output terminal, the pass transistor having a control terminal, an input terminal corresponding to the first terminal of the current control stage and an output terminal, the feedback resistor being connected between the inverting input of the operational amplifier and the output terminal of the current probe, each current control stage further including means for coupling the output of the operational amplifier to the control terminal of the pass transistor.

11. The apparatus of claim 10, wherein the means for coupling comprises a drive transistor, the drive transistor having a control terminal, an input terminal and an output terminal, the control terminal of the drive transistor being connected to the output terminal of the operational amplifier and the output terminal of the drive transistor being coupled to the control terminal of the pass transistor to drive the pass transistor in response to a signal present at the noninverting input of the operational amplifier.

12. The apparatus of claim 1, wherein the minimum circuit means includes (a) first and second operational amplifiers responsive to the first and second input signals, respectively, each operational amplifier having an inverting input terminal, a noninverting input terminal, and an output terminal, (b) means, responsive to the greater of the first and second inputs, for blocking the output of the first and second operational amplifiers, and (c) first and second feedback resistors, coupled between the means for blocking and the inverting inputs of the first and second operational amplifiers, respectively.

13. The apparatus of claim 12, wherein the means for blocking includes first and second diodes, each having an anode and a cathode, the cathodes of the first and second diodes connected to the output terminals of the first and second operational amplifiers, respectively, and the anodes of each diode coupled to each other and to the first and second feedback resistors.

* * * * *